United States Patent
Danko, Jr. et al.

[15] 3,694,072
[45] Sept. 26, 1972

[54] METHOD AND APPARATUS FOR MAKING ORTHOPHOTOS USING A FIXED FILM BED

[72] Inventors: Joseph O. Danko, Jr., Baltimore, Md.; Clinton J. T. Young, Alexandria, Va.

[73] Assignee: Danko Arlington, Inc., Baltimore, Md.

[22] Filed: Aug. 25, 1971

[21] Appl. No.: 174,635

[52] U.S. Cl. ........................... 355/22, 352/57, 356/6
[51] Int. Cl. ............................................. G03b 27/32
[58] Field of Search ................ 356/6; 355/22; 352/57

[56] References Cited

UNITED STATES PATENTS

3,244,893  5/1966  Miller ........................ 356/2 X

Primary Examiner—Samuel S. Matthews
Assistant Examiner—Michael D. Harris
Attorney—John W. Malley et al.

[57] ABSTRACT

Method and apparatus for making substantially orthographic photo images from an optically projected stereo model of three dimensional terrain without necessitating quick precision movements of a relatively massive high inertia and precision machined film bed. A flexible fiber optic bundle is used to transmit light images from a first end to a second end. The first end is scanned in three dimensions over and upon the surfaces of the three dimensional stereo model while the second end is synchronously scanned in two dimensions over photo-sensitive material held in a relatively fixed and relatively cheaply constructed film bed. In a further embodiment, a first pseudo-scanning cycle may be performed to obtain corresponding three dimensional digital scanning data for the first end of the fiber optic bundle which data are recorded and subsequently used to control a second automated real-scanning cycle where the film is actually exposed to either produce special effects such as color orthophotos or to merely permit more relaxed discontinuous operator control (including the ability to erase errors) during the first manually controlled pseudo-scanning cycle.

23 Claims, 2 Drawing Figures

METHOD AND APPARATUS FOR MAKING ORTHOPHOTOS USING A FIXED FILM BED

This invention generally relates to a method and means for obtaining orthophotographs or planimetric (i.e., orthographic) photo projections of three dimensional surfaces using optically projected stereo models thereof. Apparatus for achieving such results is generally referred to as an orthophoto instrument in the prior art.

The general art of making orthographic projections from optically projected stereo models is relatively well known today after having been introduced in a potentially practical form in the 1930's by a Frenchman, Robert Ferber and later developed to a greater degree by an American, Russell K. Bean of the U.S. Geological Survey. General information about existing orthophoto instruments may be obtained from various sources, for instance, the Manual of Photogrammetry published by the American Society of Photogrammetry, third edition, contains a discussion of prior art techniques and instruments for obtaining orthophotographs in section 17.10 on pages 867 through 872.

Basically, an orthophoto instruments as previously known includes several basic elements (to be discussed in more detail below) always used in conjunction with some means for vertically adjusting the position of a relatively massive and precisely machined film-holding bed which is expensive to manufacture and which exhibits a rather high inertia thus inhibiting precisely accurate and rapid movements thereof. As will be more clearly apparent from the following discussion, such movements are often necessary to accurately produce the desired orthophoto which requires accurately following the surface of the projected three dimensional model.

The basic operation of an orthophoto instrument will become more apparent once the other basic elements of the orthophoto instrument are explained.

In essence, the orthophoto instrument is used to obtain an approximately orthographic projection by exposing each elemental area of a photosensitive film with a light image from a corresponding area that is substantially upon the surface of an optically projected three-dimensional stereo model. The actual photographic printing is done with only one of two projectors which are necessarily utilized for actually projecting the stereo model, as will be appreciated by those in the art.

In order to accomplished this, a small "scanning aperture" or slit (corresponding to the elemental area previously mentioned) is continuously scanned or moved in a predetermined raster along x and y coordinates substantially in the plane of the photosensitive film while other portions of the photosensitive film are shielded from light exposure. Thus, the only light exposure to the photosensitive film is through the moveable aperture as it is being regularly scanned in a continuous fashion along the x and y coordinates in the plane of the film. The operator then manually controls (directly or through servo systems) a vertical adjustment of the film-holder (which of course also comprises the movable slit apparatus) to always keep the moving or scanning slit on the surface of the stereo model, or as nearly upon the surface as is possible. In this manner, each elemental area of the resulting photo image has been effectively exposed by a corresponding area upon the surface of the stereo model.

Usually, a blue light is used for projecting one of the stereo images and red light is used for projecting the other of the stereo images which, together, form the stereo model of the terrain. (The operator uses blue/red lens spectacles to keep stereo separation of the images as will be appreciated.) In most conventional orthophoto instruments, the film is sensitive only to the blue light, thus, only the blue light image is actually utilized in obtaining a monochromatic orthophoto image. Of course, the red light could be used instead if desired such as, for instance, with infrared sensitive film.

After some thought reflection on this process, those in the art will readily appreciate (if they do not already) that the result is substantially equivalent to an orthographic projection since each area of the resulting photograph has been exposed at a level corresponding to the actual surface of the stereo model. That is, the resulting photograph is substantially equivalent to a true orthographic projection of the particular terrain or other three dimensional surface of interest such that accurate quantitative measurements may now be made from point-to-point on the resulting orthophotograph which no longer incorporates the usual distortions caused by the tilt, relief, etc. of the terrain.

The particular scanning slot dimensions vary depending upon the rapidity of change in a particular terrain or surface of interest, the accuracy required in the finished orthophoto, etc. In conventional orthophoto instruments, this slot is usually formed in a very thin viewing platen and the slot is then continuously scanned in a raster over the surface of the photosensitive film. Of course, this process in itself is quite a problem since the slot is to be optimally placed as close to the film surface as possible and yet not so close as to actually damage the film surface. Furthermore, it must be controllably scanned in a raster within very accurate tolerances over the entire surface of a relatively large (typically 11 × 14 inches or more) photosensitive film. To insure that the slot can be scanned in this manner, both the scanning mechanism and the film-holding bed have had to be precisely machined. Furthermore, to hold the film properly a relatively massive film bed with vacuum chambers etc. has usually been provided.

Accordingly, such prior art orthopho instruments have been relatively expensive and complex devices. Besides having to provide means for accurately and quickly moving a relatively massive film-holder in the vertical direction, additional means must be included on the moving film-holder to scan the exposure or scanning aperture over a rather large film surface within a very close mechanical tolerance.

Using this invention, many of the disadvantages normally associated with the construction of orthophoto instruments heretofore have now been eliminated. Accordingly, orthophoto instruments constructed according to the teachings of this invention and employing the methods of this invention are relatively easier and cheaper to build while yet providing a potentially superior final product.

Briefly, this invention provides a method and means for making orthophotos without requiring the movement of a relatively massive film-holder or even a precision machined holder. Rather, a relatively light-weight viewing platen having the scanning aperture therein is scanned in three dimensions over the optically projected stereo model and with the slit being maintained substantially upon the surface of the stereo model. The light image passed by the scanning aperture is then conducted through a coherent flexible fiber optic bundle to a fixed film-holding bed where the other end of the fiber optic bundle is synchronously scanned in two dimensions over the surface of the photosensitive film using an air bearing interface therebetween. In this manner, the scanning means for scanning in three dimensions is only required to move relatively light-weight simply constructed components while the required elemental image from the surface of the stereo model is conducted through the fiber optic bundle to a relatively stationary photosensitive film.

The aperture of the fiber bundle may be determined by its own dimensions or by a mask that allows light to enter or leave it only through a certain area. This aperture normally will be of constant width over most of its length but may vary, especially in the form of a tapered position at each end; if exposures through these tapered portions overlap in successive scans, it is easier to obtain blending and to eliminate scan boundary lines in the final picture.

The end of the fiber optic bundle which is scanned in two dimensions over the photosensitive film surface is disposed in an air bearing holder such that a predetermined distance is easily maintained between the stationary film and the movable end of the fiber optic bundle while at the same time providing a virtually frictionless bearing for such movement. Thus, the film itself does not have to be in a precisely planar disposition and there is thus no requirement for a precision machined film bed.

Furthermore, a pseudo-scanning cycle may be carried out with no film in the film-holder (or at least without permitting light to pass through the exit end of the fiber optic bundle). During this pseudo-scanning cycle, the viewing platen is scanned over and upon the surfaces of the stereo model in the usual manner (i.e. with z axis position being manually controlled to keep the slot upon the stereo model surface) while digital (or analog) data representing the successive positions of the three dimensional scanning cycle are being recorded. Thereafter, film is inserted in the film-holder (and/or the exit-end of the fiber optic bundle is uncovered for scanning in two dimensions over the film-holder in synchronism with the three dimensional scanning of the entrance end of the fiber optic bundle) and the pre-recorded digital data are then utilized by conventional numerical control techniques to automatically control a second real scanning cycle wherein the film is actually exposed to produce the desired orthophoto. In this manner, the operator may perform a discontinuous scanning cycle in the first pseudo-scan while the second real scan is actually continuous in nature to insure even photographic exposure times, etc. over the entire orthophoto. Thus, the operator does not have to concentrate so hard on the first pseudo-scan and/or he may back up and erase certain of the data if he detects that an error has been made.

The printing may be performed as in the prior art by using blue light sensitive film in conjunction with blue and red projected stereo half images. Alternatively, two mutually exclusive types of polarized light may be utilized (such as plane polarized, circularly polarized to obtain the necessary stereo separation so that the operator can view (through spectacles with lenses that separate the images appropriately) the actual stereo model in controlling the vertical position of the scanning aperture during a scanning cycle thus permitting white light (of a predetermined polarization as determined by an appropriate filter) to be used for printing and thus the possibility of producing a color orthophoto if desired. Moreover, when the pseudo-scanning and real scanning in a later automated scanning cycle steps are utilized, one of the two stereo projectors can actually be turned off while the other projector projects white light for printing in the real scan cycle thereby permitting a true color orthophoto to be made regardless of whether red and blue or polarized light is utilized to obtain the necessary stereo model during the initial pseudo-scan where the necessary operator action requires the existence of the actual stereo model for adjusting the vertical position of the scanning aperture.

The vertical adjustment of the scanning aperture may be made directly by manually operated means or by available automatic three dimensional scanning means. On the other hand, a remote servo-controlled unit may be used for controlling the vertical adjustment such that the operator may have a separate hand-held manually controlled servo unit for adjusting the vertical position.

Other objects and advantages of this invention will become more apparent from the following detailed description and accompanying drawings, of which:

Figure 1:
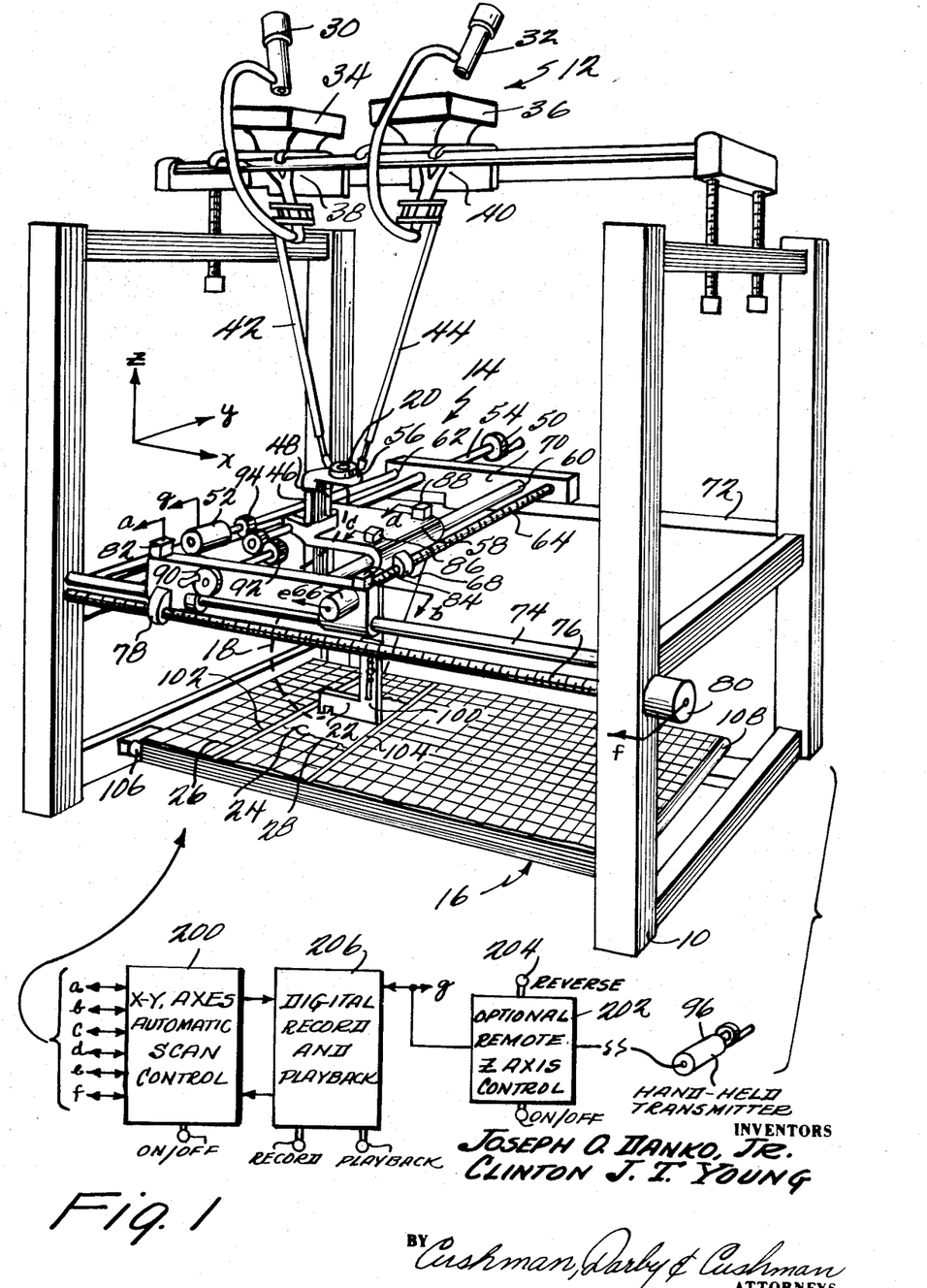
FIG. 1 is a partially pictorial and partially schematic diagram of an overall orthophoto instrument constructed according to this invention and utilizing the method of this invention.

Referring to FIG. 1, a complete orthophoto instrument constructed according to this invention is shown which utilizes the method of this invention.

Most of the essential elements are located within a fixed frame 10 having a projection means generally indicated by numeral 12 and which is located at the upper portion of the frame 10. A movable mounting means generally indicated by numeral 14 is disposed in the general mid-section of the frame 10 and a film-holding means 16 such as a vacuum chamber is disposed at the lower portion of frame 10. A flexible optical image conducting means 18 is shown as being connected between a viewing platen 20 at one end and a film scanning holder 22 at the other end. The viewing platen 20 is movable in three dimensions to scan the first end of the fiber optic bundle 18 upon the surface of the three dimensional ($x$, $y$, $z$) stereo model (provided by the projection means) while the holder 22 is linked rigidly to the movable mounting means for synchronous movement in two dimensions ($x$, $y$) of the other end of the fiber optic bundle over the surface of a photosensitive film 24. The film is generally maintained beneath a light-tight film cover 26 which may comprise, for instance, black light-opaque cloth or the like.

The black opaque light stop 26 actually covers the holder 22 and the second end of the fiber optic bundle 18 but it is shown as being cut away at 28 in FIG. 1 for the purposes of illustration.

As those in the art will no doubt readily appreciate, the projection means 12 comprises conventional projectors 30 and 32 for projecting light through predetermined halves of transparent photo images (negatives or positives) held in holders 34 and 36, i.e., to project complimentary images of a stereo pair. The transparencies held by holders 34 and 36 have been taken from two different perspectives or vantage points as, for instance, from an airplane at two different points along a predetermined path of travel as will be appreciated by those in the art. The projectors 30 and 32 are each gimbaled about respective conventional lens systems 38 and 40 which are, in turn, mechanically coupled through telescoping arms 42 and 44 respectively to an attaching structure that moves with the viewing platen 20. The attaching structure associated with the viewing platen 20 is gimbaled to permit free movement of the platen itself in the mid-section region of the frame 10 without binding the telescoping arms 42 and 44. The telescoping arms will, however, keep the gimbaled projectors 30 and 32 properly oriented at all positions with respect to the transparent stereo images so that a proper stereo model in three dimensions (when viewed by an operator using special spectacles to keep the necessary left/right eye-image separation) is optically projected into the mid-region of frame 10, as will be appreciated by those in the art.

In essence, the projection means 12 comprises any of the usual conventional projection means for forming three dimensional stereo models such as are commonly used on stereo plotters for plotting constant elevation lines, etc. from such stereo models. In actual practice, a third projector may be included on the right-hand side of frame 10 to permit the setting up of two contiguous three dimensional stereo models (on the left and right side of the frame 10 respectively) so that plotting may be continuously carried out from one end to the other of the frame, as will be appreciated by those in the art.

The mid-section or movable mounting means 14 generally comprises a platen 20 which is vertically adjustable on parallel rods 46 and 48 by virtue of either hand-operated cranks 50, 90 or a remote controlled motor 52. Either the hand-cranks 50, 90 or the motor 52 will result in a rotation of shaft 54 which is keyed to the pinion of a rack and pinion mechanical adjustment for obtaining vertical movement of platform 56 upon which platform the scanning aperture 20 is mounted. Of course, a lead screw z axis adjustment could also be utilized as could many other possible mechanical adjustment systems.

This movement in the vertical direction (i.e. along the z axis) is necessary to keep the scanning aperture in the surface of the three dimensional model as the platen is being translated in a predetermined scan raster along the x and y axis directions. Movement along the y axis direction is obtained by moving platform 58 along parallel rods 60 and 62 through a rotation of lead screw 64. The lead screw 64 is rotated by a motor 66 and by virtue of the threadable connection at 68 with platform 58, the whole platform 58 (including its component, the vertically adjustable platform 56) is then translated along the y axis direction at a speed determined by the motor 66 and the pitch of the lead screw 64 as will be apparent to those in the art.

Movement in the mutually perpendicular x axis direction is obtained by moving the frame 70 along rods 72 and 74 by virtue of a lead screw 76 which is threadably attached to the frame 70 at 78 and rotated by motor 80. As before, the movement in the x direction is determined by the speed of motor 80 and the pitch of the lead screw 76 as will be apparent to those in the art. As shown in FIG. 1, the platform 58 which is translated along the y axis direction is itself carried within the frame 70 which is translatable along the x direction. Furthermore, the vertically adjustable platform 56 is mounted upon the platform 58. Accordingly, by properly controlling the motors 66 and 80, the platform 58 may be scanned (and hence the scanning aperture on viewing platen 20) in a regular scan raster along the x and y axis directions as should now be apparent. Furthermore, as such a scan raster is traversed, the vertical position of the viewing platen 20 may be adjusted by hand-wheel 50 or motor 52 to keep the scanning aperture of the viewing platen upon the surface of the stereo model.

To make the x, y scan raster completely automatic, limit switches 82 and 84 are mounted to detect the end-of-travel in the left and right directions along the x axis motion while limit switches 86 and 88 are mounted to detect the end of travel in the y axis directions. As should now be apparent to those in the art, a completely automatic x—y scan raster may be performed by first, causing the motor 66 to operate at a constant speed in a given direction until the limit switch for motion in that direction is actuated, whereupon the direction of the motor 66 is reversed while the speed is again maintained at the same constant value. Thereafter, the end-of-travel detector for movement in the new direction is connected to cause subsequent reversal of the motor direction back to its initial direction, etc., thus continuously cycling the platform 58 back and forth on rods 60 and 62 in the y axis directions at a constant speed. Furthermore, each time one of the end-of-travel detectors 86 or 88 is actuated, the motor 80 should be energized momentarily for a predetermined number of rotations of lead screw 76 thus traversing the carriage or frame 70 along rods 72 and 74 for a predetermined distance corresponding to the scanning aperture dimensions as should be apparent to those in the art.

In some cases, it may be desirable to scan at other than constant speed. For instances, if a model contains a great deal of variation of height in some areas and little in others, the operator in reading and recording data in a pseudo-scan may wish to use a higher traverse speed in the flatter areas than in those with more rapid height changes. Again, in exposing the film, controlled variations in scanning speed may be used to equalize exposure, connecting for variations in density in the picture transparency.

The vertical adjustment of platform 56 may be obtained by manually manipulating wheel 50 when on the far side of the machine and wheel 90 when on the near side of the machine as shown in FIG. 1. By virtue of the reversing gears 92, 94, the same relative directions or rotations of wheels 50 and 90 will result in vertically ascending or descending movements of platform 56 regardless of which side is used by the operator. Furthermore, the movements in the vertical direction of platform 56 may be achieved remotely by properly energizing motor 52 from a hand-held transmitter 96. If desired, a switch might be included for reversing the direction of the motor 52 depending upon the particular side of the machine where the operator happens to be thus maintaining the same directions of rotation for the hand-held unit with respect to ascending or descending movements of the platform 56. For instance, the motor 52 and the hand-held transmitter 96 may comprise conventional electrical selsyn motor transmitter/receiver units as will be appreciated by those in the art.

Platform 58 which is translated in the scan raster along the x and y coordinate directions includes a rigidly attached arm 100 which is utilized for moving the holder 22 in a synchronous fashion along the desired x—y scan raster over the film surface 24. The holder 22 and arm 100 move back and forth in the y direction with corresponding movements of platform 58 and within a channel formed by guides 102 and 104 in the light opaque covering 26. Furthermore, the channel formed by guides 102 and 104 is itself translatable in the x direction by virtue of the fact that the light opaque screen 26 is itself movable over rollers 106 and 108 at either end of the film-holder 16 as shown in FIG. 1. As previously mentioned, the entire film surface 24 is actually covered by the light opaque screen 26 to prevent light exposure of the film 24 except through the exit end of the fiber optic light image conducting bundle 18 as should now be apparent.

Figure 2:
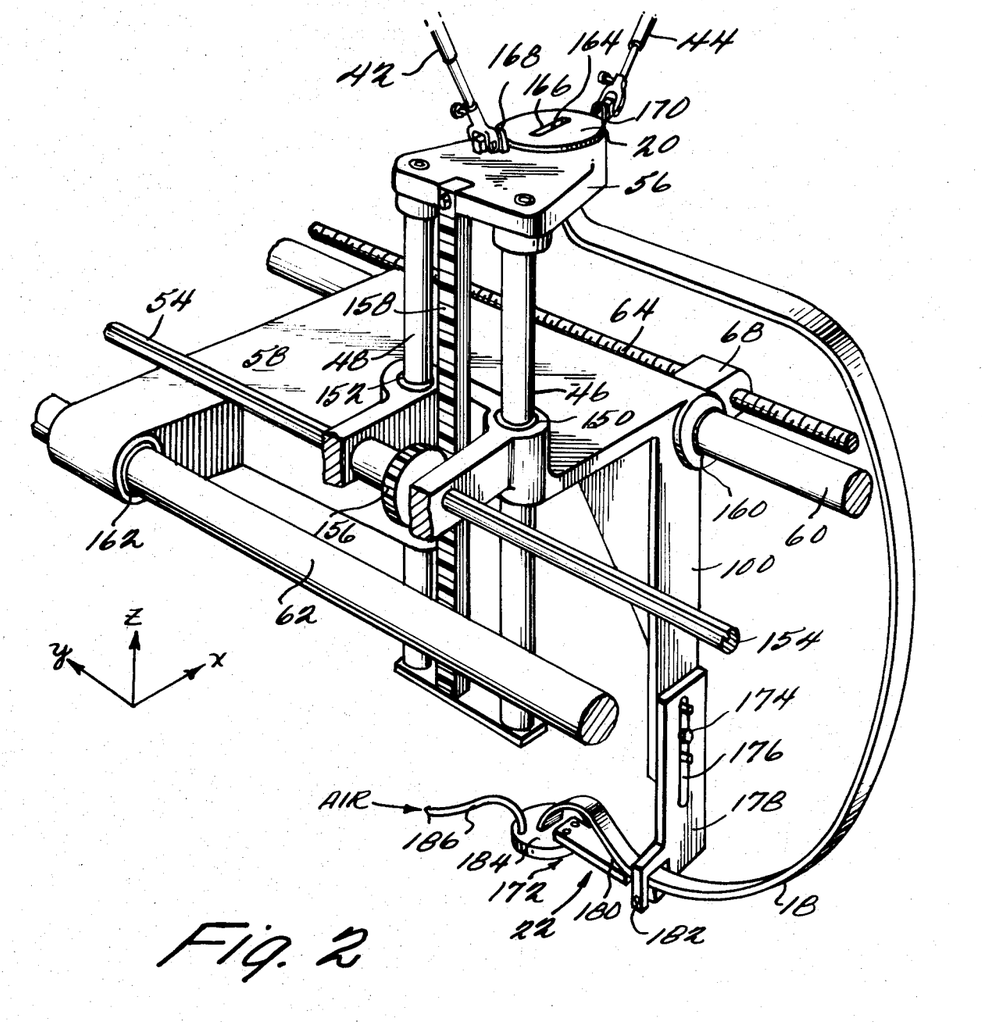
FIG. 2 is a close-up pictorial view of a portion of the movable means of the orthophoto instrument shown in FIG. 1.

A portion of the movable mounting means 14 is shown in more detail at FIG. 2.

Here, the vertically adjustable platform 56 is shown mounted on rods 48 and 46 which are movable through precision ball-bushings 150 and 152 mounted in platform 58. Actually, there is a third ball-bushing hidden from view in FIG. 2 to provide a three point rigid mounting for the platform 56 on rods 46, 48. The vertical adjustment, as previously explained, is obtained by rotating shaft 54. Shaft 54 is keyed (using keyway 154 as shown in FIG. 2) so that pinion 156 is free to slide along the shaft 54 in the y direction while yet being rotatably rigid by virtue of the keyway 154. Thus, when the shaft 54 is turned, the pinion gear 156 is likewise turned and by virtue of its engagement with rack gear 158, the platform 56 is vertically adjusted as should be apparent. The movement of platform 58 in the y direction is by virtue of movement through ball-bushings 160 and 162 in the platform 58 through which rods 60 and 62 respectively passed. Actually, there is a third ball-bushing hidden from view in FIG. 2 to provide a three point rigid mounting for the platform 58 upon the rods 60 and 62.

The fiber optic bundle 18 is shown in FIG. 2 comprising a substantially rectangular cross-sectioned bundle of many optically conducting fibers having a first end 164 which is exposed in an aperture 166 in the viewing platen 20. The fiber optic bundle 18 is conventionally available from such sources as the American Optical Corporation, Southbridge, Mass. Generally, such flexible image conducting means comprises thousands of clad light conducting fibers that are fused together to form a bundle or rod, that is capable of transmitting a light image from one end to the other with only acceptable losses in intensity and/or resolution. Of course, the scanning aperture permits effective use of only a desired cross-sectional area of the bundle as should be apparent.

The image passing through the scanning aperture 166 is then conducted by the fiber optic bundle 18 down to its second end generally indicated as 172 in FIG. 2. (The actual end is hidden from view.)

Since the arm 100 is rigidly attached to the platform 58 and since the platform 58 is scannable along a raster in the x—y coordinate directions as previously discussed, it follows that the arm 100 and the holder 22 for the second end of the fiber optic bundle 18 will similarly be scanned along a raster in two coordinate directions, namely, the x—y coordinates.

The length of arm 100 is effectively adjusted by bolt 174 and slot 176 which adjustably secure a lower extension 178 to the upper portion of arm 100 as should be apparent from FIG. 2. However, this adjustment is only a rough one and not intended to be the final positioning determinant for the second end face or exit end of the fiber optic bundle 18. Rather, a second arm 180 projects horizontally from arm 100 and is freely movable at bearing 182 to provide vertical movement at the opposite end of arm 180 where a holder 184 accurately maintains the position of the second end face of the fiber optic bundle 18 with respect to arm 100 in the x and y coordinate directions. Of course, the whole arm 100 is translated according to the scan raster in the x and y directions as previously noted thus causing the second end of the fiber optic bundle to be scanned in two dimensions in the x—y direction as should now be apparent.

Furthermore, the vertical adjustment of the second end of fiber optic bundle 18 is critical only insofar as it should be maintained at a relatively constant height above the film surface 24 but yet not so close thereto that it actually damages the film surface. A very important reason for controlling separation between the end of the fiber optic bundle and the fiber is the fact that light diverges rapidly from the end of each fiber. Therefore, image quality will be reduced if the separation is so large that any point receives much light from more than one fiber. This problem is readily apparent to those skilled in the art. The object of controlling separation is achieved by providing an air bearing in holder 184. That is, air is input at 186 under a suitable pressure and output at one or more openings of the bottom side of holder 184 to provide a cushion of air having predetermined dimensions between the bottom of holder 184 and the top of the film surface 24. In this manner, slight adjustments are made for the second end of the fiber optic bundle 18 to maintain a predetermined distance above the surface of the film while translating thereover in the x—y coordinate raster.

Instead of the laterally projecting hinged arm 180 for permitting vertical adjustment of the exit end of fiber optic bundle 18, other means could be used. For instance, a telescoping mechanical connection that is rigid in x—y directions but freely slidable but not rotatable in the z direction could be provided to permit z direction adjustments of the air bearing cushioned holder for the exit end of fiber optic bundle 18.

Referring back to FIG. 1 it will be noted that electrical connections from the end-of-travel sensors 82, 84, 86 and 88 as well as the x and y axis coordinate motors 80 and 66 respectively are connected via wires a, b, c, d, e and f, respectively to a conventional automatic scan control unit 200. The scan control unit 200 may be of conventional design quite similar to those in the prior art used for translating the scanning slit in the actual plane of the film while the whole film bed itself was being vertically adjusted. For instance, the end-of-travel sensors may compromise conventional limit switches which are, in turn, electrically connected to corresponding conventional latching relays or flip-flops or the like in scan control unit 200 which are interconnected to result in a pre-programmed automatic scan raster along the x and y coordinates. That is, each time an end-of-travel detector is activated, the direction of travel along the corresponding coordinate axis is reversed for motor 66 and end-of-travel detectors 84 and 88. Furthermore, each time such a reversal occurs, motor 80 is temporarily energized or stepped or otherwise activated to cause lead screw 76 to advance the carriage or frame 70 a predetermined distance corresponding to the dimensions of the scanning aperture in the x direction. The limit switches 82 and 86 may be utilized to cause automatic reversal of motor 80 in a similar fashion although, for practical purposes, the carriage 70 will usually begin at one extreme end of the frame 10 and traverse in successive steps to the other extreme end with a step being taken each time a complete traverse of platform 58 is completed in the y coordinate direction as should now be apparent. Accordingly, the limit switches 82 and 86 are not absolutely essential except for starting and stopping the complete scanning cycle.

In addition, electrical connection g from motor 52 is connected through an optional remote z axis control unit 202 to a hand-held transmitter 96 as previously indicated. Thus, when the remote z axis control unit 202 is turned on, the hand-held transmitter 96 may be used in lieu of the hand operated wheels 50 and 90. As previously discussed, the reversing switch 204 may be incorporated in this control unit to reverse the direction of motor 52 as a function of the operator's position.

Additionally, a conventional digital or numerical machine control unit 206 may also be incorporated in the orthophoto instrument of this invention. Such a system is particularly advantageous to reduce the necessary operator attention and to produce special effects such as color orthophotos, etc. as will soon become more apparent.

When the digital control unit 206 is utilized, two related scanning cycles are effected. A first scanning cycle may be termed a "pseudo-scan" wherein the platen 20 and its scanning aperture are scanned as in the usual fashion along three dimensions but where now the motors 80, 66 and 52 are utilized as transmitters or generators to indicate the relative x, y and z coordinates respectively of the scanning aperture. This information is input from the automatic scan control unit 200 and from the electrical connection g to a conventional digital recording device which digitizes and records data representing the successive three dimensional coordinates utilized in scanning upon the surface of the stereo model. By properly controlling the recording equipment, the operator may stop and rest occasionally to effect a rather discontinuous type of pseudo-scanning operation which will not be reflected in the recorded information since the recording device will be effectively deactivated during the operator's temporary rest period. Furthermore, if the operator determines that he has just made an error he may back up and retrace that particular portion of the scanning cycle to replace the just recorded faulty digital information with accurate information. During this pseudo-scan, there is either no film 24 in the film holder 16 or the lower portion of arm 100 is moved so that the passage of light is blocked so that it is not carried to the film 24 through the fiber bundle 18. In this manner, no matter how often the operator rests or how often he makes mistakes and corrects those mistakes, no film will be exposed and hence wasted. Accordingly, the operator can take his time in this pseudo-scan to make certain that the vertical position of platen 20 is exactly on the surface of the stereo model at each point in the raster scan to obtain a more perfect tracing of the three dimensional model. Thereafter, the recorded digital coordinate information is played back and utilized with conventional control apparatus to control the movements of motors 80, 66, and 52 respectively to reproduce exactly the recorded scanning pattern in a second real-scan wherein the fiber optic bundle 18 and arm 100 are in proper operating position (or obstruction to light passage is removed) and a sheet of photosensitive film 24 is in film-holder 16 to result in an actual printing of the desired orthophoto.

Of course, during the pseudo-scan it is necessary that the proper stereo image separation be maintained to result in the operator seeing the necessary stereo image or model of the terrain. However, during the second real scan operation it is not actually necessary for the three dimensional model to be in existence but rather, only one of the projectors 30 and 32 needs to be energized. If, as with the conventional orthophoto instruments, one of the stereo images is formed with blue light and the other with red light and the film is sensitive only to the blue light then of course, it is not absolutely necessary to turn off one of the projectors since the film will only respond to the blue light. Furthermore, polarized light can be similarly used where appropriate steps are taken to insure that polarized light from only one stereo image is actually utilized in printing the orthophoto on the photosensitive material 24. Moreover, it is possible to utilize only one of the projectors without any color filters or polarizing filters, etc. to project a white light image for printing a color orthophoto on the photosensitive material 24 as previously discussed.

Accordingly, this invention provides both an apparatus and method for obtaining orthophotos in a simpler and more efficacious manner than previously possible with prior art orthophoto instruments. A massive film bed does not have to be moved with this invention nor does the film bed itself have to be made with such precision to hold the film in an exact planar position as with the prior art machines since the exit end of the light fiber bundle 18 is free to adjust its vertical position to slight changes in the plane of the film while yet being maintained at a proper predetermined distance from the film surface. Rather, only the relatively light-weight platform 56 with the viewing platen 20 and scanning aperture needs to be vertically moved during the scan raster along the x and y coordinates. This permits the operator to quickly adjust the vertical or z axis direction movements in response to rapid changes in terrain topography, etc. as should be apparent to those in the art. Furthermore, this invention permits color printing of orthophotos by several different techniques and, because there is no need to move the entire film bed up and down, etc. larger sheets of film may be utilized to obtain larger magnification factors in resulting original orthophotonegatives. In addition, a conventional digital numerical control unit may be used to permit discontinuous plotting in a first pseudo-scan followed by a real scan cycle where the actual orthophoto negative is printed.

If desired, the data taken during the pseudo-scanning cycle may be in analog rather than digital form. In this case, conventional analog recording equipment would be utilized to record analog data representing the coordinate positions of the three dimensional pseudo-scan. The recorded analog data are then used in analog data control techniques to cause the motors to retrace the model in a real scanning cycle, as should now be appreciated by those skilled in the art.

The use of fiber optics has been described as a preferred means of allowing for variation in the z dimension between the optical model contour and the photographic film. It will be apparent to those skilled in the art that this can be accomplished by other means such as a train of reflecting surfaces and one or more lenses or a lens system of constant magnification but variable overall length.

While only a few embodiments of this invention have been particularly described in the above specification, those skilled in the art will readily appreciate that these embodiments are only intended to be exemplary of possible methods and apparatus for achieving practical results with the invention. Many obvious modifications may be made to the exemplary embodiments without materially altering the stated functions, purposes and objectives of this invention. Accordingly, all such modifications are intended to be included within the scope of this invention.

What is claimed is:

1. An orthophoto instrument for plotting substantially orthographic projections of three dimensional surfaces using an optically projected three dimensional stereo model of the surface, said instrument comprising:
    projection means for optically projecting said three dimensional stereo model,
    flexible optical image conducting means having a predetermined effective cross-sectional area for conducting optical images therethrough from a first end to a second end thereof,
    film-holding means for holding a surface of a photosensitive material in a predetermined position, and
    movable mounting means connected to the flexible optical image conducting means for effecting three dimensional scanning of said first end over and substantially upon the surfaces of said three dimensional stereo model while effecting synchronous simultaneous two dimensional scanning of said second end over the surface of said photosensitive material thereby plotting said orthographic projection thereon.

2. An orthophoto instrument as in claim 1 further comprising automatic scanning means for automatically effecting synchronous scanning of the first and second ends along at least two of the three dimensional coordinate directions.

3. An orthophoto instrument as in claim 1 further comprising:
    digitizing and recording means for recording digital data representing successive three dimensional positions of said first end during a first pseudo-scanning cycle wherein at least one dimensional coordinate position is manually determined to keep said first end substantially upon the surfaces of said three dimensional stereo model, and
    digital control means for utilizing such recorded digital data in a second automatically controlled real scanning cycle wherein the desired orthographic projection is actually printed onto the photosensitive material.

4. An orthophoto instrument as in claim 1 wherein said movable mounting means includes air bearing means for holding said second end substantially at a predetermined distance from the photosensitive material during scanning thereof.

5. An orthophoto instrument as in claim 1 wherein said predetermined effective cross-section is substantially rectangular at both said first and second ends.

6. An orthophoto instrument as in claim 1 wherein said first end is mounted in alignment with an aperture in a viewing platen.

7. An orthophoto instrument as in claim 1 wherein said movable mounting means comprises three members, each being relatively adjustable in a direction substantially orthogonal to that of the other members.

8. An orthophoto instrument as in claim 1 further including:
    x—y scanning means for automatically scanning said first and second ends in a predetermined x—y raster along orthogonal x and y axis directions in two dimensions, and
    z adjustment means for moving said first end along a z axis perpendicular to both said x and y axis.

9. An orthophoto instrument as in claim 8 wherein said z adjustment means is manually operable.

10. An orthophoto instrument as in claim 9 wherein said z adjustment means is manually operable through a remote control hand-held unit.

11. An orthophoto instrument for plotting orthographic projections from optically projected three dimensional stereo models, said instrument comprising:
    projection means for optically projecting said three dimensional stereo model,
    a stereo model viewing platen having an aperture therein,
    mounting means for adjustably positioning said viewing platen along three dimensions in the region of said stereo model,
    optical image conducting means connected at one end to said platen for conducting therefrom an optical image passing through said aperture and corresponding to a selected portion of said stereo model as determined by the position of said platen, film-holding means for holding a photosensitive material, and film exposing means connected to the other end of said optical image conducting means and rigidly associated with at least part of said mounting means for synchronous movement of the said other end with respect to said platen in two dimensions over said film-holding means whereby an orthographic projection may be obtained on said photosensitive material by scanning the aperture in said two dimensions and simultaneously adjusting said platen in the remaining third dimension to substantially maintain the aperture on the surface of said stereo model.

12. An orthophoto instrument as in claim 11 further comprising automatic scanning means for automatically moving said platen aperture and said film exposing means in a constant rate raster scanning motion back and forth along one of said two dimensions with successive end-of-travel indexing movements along the other one of said two dimensions.

13. An orthophoto instrument as in claim 11 wherein said mounting means comprises:
a platform mounted within a first frame, said platform being slidably positioned on two parallel elongated means oriented along one of said two dimensions,
a first lead screw mounted within said first frame and connected to said platform for effecting platform movement along said parallel elongated means by rotation of said first lead screw,
said first frame being mounted within a second frame and along being slidably positioned on two further parallel elongated means oriented along the other one of said two dimensions,
a second lead screw mounted within said second frame and connected to said first frame for effecting first frame movement along said further parallel elongated means by rotation of said second lead screw,
a further platform mounted on said first-mentioned platform for carrying said platen, and
vertical positioning means connected between both of said platforms for effecting desired positions adjustments of said platen in the third dimension.

14. An orthophoto instrument as in claim 13 further comprising:
first motor means connected for rotating said first lead screw,
second motor means connected for rotating said first lead screw,
end-of-travel detector means for detecting when predetermined movement limits have been reached for at least one of said two dimensions, and
automatic scan means connected to said first and second motor means and to said end-of-travel detector means for effecting automatic coordinate energization of each of the motor means to obtain an automatic raster scan of said aperture over a predetermined area in said two dimensions.

15. An orthophoto instrument as in claim 12 wherein said vertical positioning means comprises a manually operated rack and pinion gear arrangement.

16. An orthophoto instrument as in claim 12 wherein said vertical positioning means comprises a remote controlled electromechanical adjustment means.

17. An orthophoto instrument as in claim 16 wherein said electromechanical adjustment means comprises an electrical servo motor.

18. An orthophoto instrument as in claim 12 wherein said vertical positioning means comprises both direct manually operated means and remotely controlled electromechanical means together with selection means for permitting either mode of vertical adjustment to be used.

19. An orthophoto instrument as in claim 11 further comprising:
digital recording means for recording digitized signals representing successive three dimensional positions of said aperture during a first three dimensional pseudo-scanning cycle where at least the third dimension position adjustment is effected by manually controlled means, and
digital control means for automatically effecting a second continuous three dimensional real scanning cycle in accordance with the recorded digitized signals whereby the first pseudo-scanning cycle may be carried out without photosensitive material in the film-holding machine and even in a discontinuous fashion if desired while the second continuous real scanning cycle is then carried out with photosensitive material to result in the desired orthophoto.

20. An orthophoto instrument as in claim 11 wherein said film exposing means comprises:
a holder for positioning the surface of said other end of said optical image conducting means in a plane that is substantially parallel to the plane of the photosensitive material,
said holder being freely movable in a direction perpendicular to the plane of the photosensitive material, and
said holder including air bearing means for providing an air bearing of substantially predetermined dimensions between said surface of the other end and said photosensitive material whereby the film exposing means is freely translatable over the photosensitive material at a predetermined distance therefrom.

21. An orthophoto instrument as in claim 11 wherein said optical image conducting means comprises a flexible coherent bundle of optically conducting fibers, said bundle having a generally rectangular overall cross-section at the ends thereof.

22. A method for plotting orthographic projections using an optically projected three dimensional stereo model, said method comprising the steps of:
projecting an optical three dimensional stereo image,
scanning a first end of an optical image conducting means having a predetermined effective cross-sectional area in three dimensions substantially along and upon the three dimensional surfaces of said stereo image, and
synchronously scanning a second end of said optical image conducting means in two of said three dimensions over the surface of a photosensitive material.

23. A method as in claim 22 wherein said first mentioned scanning step is performed in conjunction with a step of digitally recording data representing the successive three dimensional scanning positions and wherein said synchronously scanning step is thereafter automatically carried out simultaneously with an automatic repeat of the first mentioned scanning step using the digitally recorded data to cause an automatic scan of both ends of the optical image conducting means.

* * * * *